United States Patent
Yamada et al.

(10) Patent No.: US 8,715,830 B2
(45) Date of Patent: May 6, 2014

(54) ELECTRICALLY CONDUCTING MEMBER, PROCESS CARTRIDGE, AND ELECTROPHOTOGRAPHIC APPARATUS

(71) Applicant: Canon Kabushiki Kaisha, Tokyo (JP)

(72) Inventors: Satoru Yamada, Numazu (JP); Norifumi Muranaka, Yokohama (JP); Kazuhiro Yamauchi, Suntou-gun (JP); Satoru Nishioka, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/917,543

(22) Filed: Jun. 13, 2013

(65) Prior Publication Data
US 2013/0279936 A1   Oct. 24, 2013

Related U.S. Application Data

(63) Continuation of application No. PCT/JP2012/007988, filed on Dec. 13, 2012.

(30) Foreign Application Priority Data

Dec. 22, 2011  (JP) ................................ 2011-282226

(51) Int. Cl.
*G03G 15/02* (2006.01)
(52) U.S. Cl.
USPC ........................... 428/413; 399/168; 399/176
(58) Field of Classification Search
None
See application file for complete search history.

(56) References Cited

U.S. PATENT DOCUMENTS

| 6,127,622 A | 10/2000 | Yamada et al. |
| 7,947,339 B2 | 5/2011 | Yamauchi et al. |
| 8,298,670 B2 | 10/2012 | Muranaka et al. |
| 8,449,975 B2 | 5/2013 | Hirakoso et al. |
| 2009/0011350 A1* | 1/2009 | Ji ................................ 430/96 |
| 2012/0020700 A1 | 1/2012 | Yamada et al. |

(Continued)

FOREIGN PATENT DOCUMENTS

| JP | 10-221929 A | 8/1998 |
| JP | 2001-140855 A | 5/2001 |

(Continued)

OTHER PUBLICATIONS

PCT International Search Report and Written Opinion of the International Searching Authority, International Application No. JP2012/007988, Mailing Date Jan. 29, 2013.

(Continued)

Primary Examiner — Ramsey Zacharia
(74) Attorney, Agent, or Firm — Fitzpatrick, Cella, Harper and Scinto

(57) ABSTRACT

To provide an electrically conducting member for electrophotography which can not easily come to change in electrical resistance value even upon application of direct current and also has made any ion conducting agent kept from bleeding. The electrically conducting member has an electrically conducting substrate and an electrically conducting layer; the electrically conducting layer containing an epichlorohydrin rubber having in the molecular structure at least an alkylene oxide (AO) unit, an epichlorohydrin (ECH) unit and a unit having a sulfonate ion; the AO unit being at least one unit of an ethylene oxide unit, a propylene oxide unit and a butylene oxide unit; and the AO unit(s) in the rubber being in a content of 5 to 60% by mass in total and the ECH unit in the rubber being in a content of 30% by mass or more.

8 Claims, 4 Drawing Sheets

(56) References Cited

U.S. PATENT DOCUMENTS

| | | |
|---|---|---|
| 2012/0251171 A1 | 10/2012 | Muranaka et al. |
| 2012/0263499 A1 | 10/2012 | Yamauchi et al. |
| 2012/0281998 A1 | 11/2012 | Kikuchi et al. |
| 2012/0308261 A1 | 12/2012 | Tsuru et al. |
| 2013/0236213 A1 | 9/2013 | Yamauchi et al. |
| 2013/0281275 A1 | 10/2013 | Nishioka et al. |
| 2013/0281276 A1 | 10/2013 | Watanabe et al. |

FOREIGN PATENT DOCUMENTS

| | | |
|---|---|---|
| JP | 2001-273815 A | 10/2001 |
| JP | 2006-189894 A | 7/2006 |
| JP | 2007-199599 A | 8/2007 |

OTHER PUBLICATIONS

Kikuchi, et al., U.S. Appl. No. 13/875,202, filed May 1, 2013.

* cited by examiner

ELECTRICALLY CONDUCTING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2012/007988, filed Dec. 13, 2012, which is claims the benefit of Japanese Patent Application No. 2011-282226, filed Dec. 22, 2011.

BACKGROUND OF THE INVENTION

1. Field of the Invention

The present invention relates to an electrically conducting member for electrophotography, and to a process cartridge and an electrophotographic apparatus which make use of the same.

2. Related Background Art

In recent years, as electrophotographic apparatus are made much more high-speed and long-lifetime, electrically conducting members for electrophotography are sought to have a high durability. Hence, any small changes in physical properties that have not come into question until then cause image difficulties in some cases because of their service over a long period of time. In particular, changes in electrical resistance value have come to be an important factor for the high durability of the electrically conducting members.

Conductive particles such as carbon black and metal oxides which are mixed and dispersed in an elastomer are sometimes used in the electrically conducting members. Such conductive particles are advantageous in that they have so high a conductivity as to cause less environmental variations.

However, such an electrically conducting member with conductive particles dispersed therein makes it difficult in some cases to regulate its electrical resistance value, and comes to be locally non-uniform in electrical resistance value in some cases because of non-uniform dispersion of the conductive particles. Where such an electrically conducting member is used in an electrophotographic apparatus, what is called a pinhole leak occurs in some cases when any excess electric current flows in an electrophotographic photosensitive member (photosensitive member) at its part having a low resistance, to cause faulty images.

To cope with this, as an electrically conducting member having remedied non-uniformity of electrical resistance value, an electrically conducting member is proposed in which an ion conducting agent is added to a polar polymer such as hydrin rubber to regulate the electrical resistance value. However, where the ion conducting agent is used, it has come about that the ion conducting agent ionizes into anions and cations when a direct current is continued to be applied, so that the anions and cations move to come localized, thereby making the electrical resistance value increase gradually.

It has also come about that a low-molecular weight component (e.g., the ion conducting agent) contained in the electrically conducting member may bleed to its surface as a result of coming under an electric field or repeated stress, to cause photosensitive member contamination or the like to make faulty images occur.

As a means for remedying such phenomena, Japanese Patent Application Laid-open No. 2006-189894 discloses that a specific quaternary ammonium salt capable of lowering the electrical resistance value by its addition in a small quantity is used as the ion conducting agent. Japanese Patent Application Laid-open No. 2001-273815 also discloses that a quaternary ammonium salt having an OH group is used in an attempt to keep the ion conducting agent from bleeding.

SUMMARY OF THE INVENTION

However, according to studies made by the present inventors, the techniques disclosed in Japanese Patent Application Laid-open No. 2006-189894 and Japanese Patent Application Laid-open No. 2001-273815 can not avoid localization of quaternary ammonium ions due to their movement, and the electrical resistance comes to vary in some cases because of long-term service.

Accordingly, the present invention is directed to providing an electrically conducting member for electrophotography that can be kept from varying in electrical resistance value, even by its long-term service, and also has made any ion conducting agent kept from bleeding to its surface.

Further, the present invention is directed to providing a process cartridge, and an electrophotographic apparatus, that can stably form high-grade electrophotographic images.

According to one aspect of the present invention, there is provided an electrically conducting member for electrophotography comprising an electrically conducting substrate and an electrically conducting layer provided thereon, wherein; the electrically conducting layer comprises an epichlorohydrin rubber having in the molecular structure at least an alkylene oxide unit, an epichlorohydrin unit and a unit having a sulfonate ion; the alkylene oxide unit being at least one unit selected from the group consisting of an ethylene oxide unit, a propylene oxide unit and a butylene oxide unit; and wherein the total content of the alkylene oxide unit(s) in the epichlorohydrin rubber is from 5% by mass or more to 60% by mass or less, and the content of the epichlorohydrin unit in the epichlorohydrin rubber is 30% by mass or more.

According to further aspect of the present invention, there is provided a process cartridge which is so constituted as to be detachably mountable to the main body of an electrophotographic apparatus. According to further aspect of the present invention, there is provided an electrophotographic apparatus which has the above electrically conducting member.

According to the present invention, an electrically conducting member can be obtained which can not easily come to change in electrical resistance value even upon application of a direct current, and also has made any ion conducting agent kept from bleeding. According to the present invention, a process cartridge and an electrophotographic image forming apparatus can also be obtained which can stably form high-grade electrophotographic images over a long period of time.

Further features of the present invention will become apparent from the following description of exemplary embodiments with reference to the attached drawings.

DESCRIPTION OF THE EMBODIMENTS

-Electrically Conducting Member-

The electrically conducting member of the present invention has at least an electrically conducting substrate and an electrically conducting layer provided on this substrate. The electrically conducting member of the present invention may be used as an electrically conducting member (electrically conducting member for electrophotography) carried in image forming apparatus (electrophotographic apparatus) that employ an electrophotographic process (electrophotographic system), such as copying machines and laser beam printers. Stated specifically, it is usable as a charging member, a developing member, a transfer member, a destaticizing member, or a transport member such as a paper feed roller. It is also favorable for an electrically conducting member to which a direct current is constantly applied, such as a charging blade or a transfer pad.

As the shape of the electrically conducting member, it may appropriately be chosen, and may be, e.g., roller-shaped or belt-shaped. In the following, the present invention is described taking note of a roller-shaped electrically conducting member (electrically conducting roller), in particular, any of a charging roller and a developing roller that are typical examples of the electrically conducting roller, to which, however, the present invention is by no means limited.

Figure 1A:
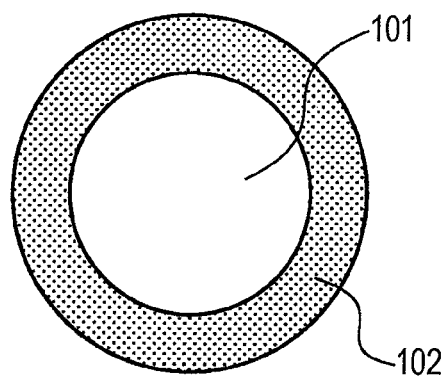
FIG. 1A is a schematic sectional view showing an example of the electrically conducting member of the present invention.
Figure 1B:
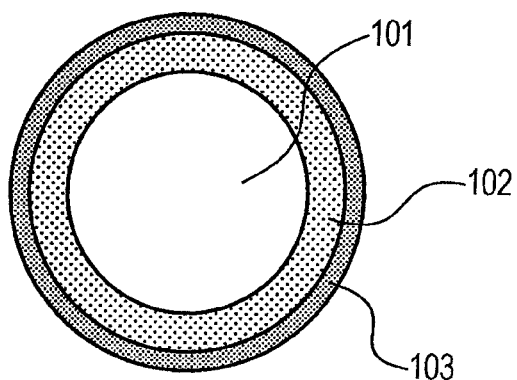
FIG. 1B is a schematic sectional view showing another example of the electrically conducting member of the present invention.
Figure 1C:
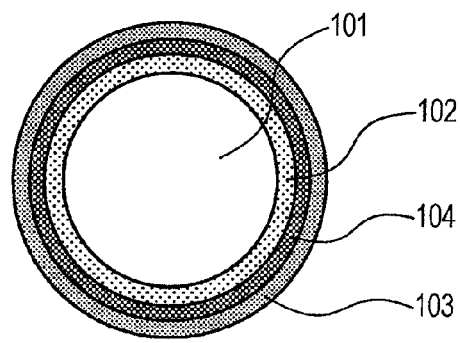
FIG. 1C is a schematic sectional view showing still another example of the electrically conducting member of the present invention.

Schematic sectional views of three examples of the roller-shaped electrically conducting member according to the present invention are given in FIGS. 1A, 1B and 1C (schematic sectional views of electrically conducting rollers as viewed when cut perpendicularly to the axial direction of their electrically conducting mandrels each).

The electrically conducting member of the present invention may be, as shown in FIG. 1A, constituted of an electrically conducting mandrel 101 that is the electrically conducting substrate, and provided on its peripheral surface, an elastic layer 102. In this case, the elastic layer 102 is the electrically conducting layer used in the present invention, which contains an epichlorohydrin rubber having an alkylene oxide (AO) unit, an epichlorohydrin (ECH) unit, and a unit having a sulfonate ion (hereinafter also "sulfo unit")

The electrically conducting member may also be, as shown in FIG. 1B, provided with a surface layer 103 on the peripheral surface of the elastic layer 102. It may still also be, as shown in FIG. 1C, provided with an intermediate layer 104 between the elastic layer 102 and the surface layer 103. Thus, the electrically conducting member of the present invention may be of multiple-layer structure in which a plurality of layers are provided on the electrically conducting substrate. In the case of the multiple-layer structure, at least one layer of the layers provided on the electrically conducting substrate may be the electrically conducting layer of the present invention, containing the above epichlorohydrin rubber.

Electrically Conducting Substrate

The electrically conducting substrate has conductivity in order to supply electricity to the surface of the electrically conducting roller. As the electrically conducting substrate, what is known in the field of electrophotographic apparatus may appropriately be used. For example, it may include a columnar shaft member obtained by plating a columnar carbon steel alloy with nickel on its surface in a thickness of about 5 μm.

Electrically Conducting Layer

The electrically conducting layer used in the present invention may be a layer that chiefly assumes electrical characteristics of the electrically conducting member when the electrically conducting member is set up. Also, the electrically conducting layer used in the present invention contains an epichlorohydrin rubber composed specifically as in the following. The electrically conducting layer may be composed of this epichlorohydrin rubber, or may, in addition thereto, also contain various compounding agents described layer.

Epichlorohydrin Rubber

The epichlorohydrin rubber used in the present invention has in the molecular structure at least the AO unit, the ECH unit and the sulfo unit as mentioned above. In addition thereto, it may also contain in the molecular structure a unit coming from allyl glycidyl ether (an allyl glycidyl ether unit).

1) Alkylene Oxide Unit.

The AO unit is any one of, or a plurality of any of, the ethylene oxide unit (EO unit), the propylene oxide unit (PO unit) and the butylene oxide unit (BO unit).

The EO unit is represented by the following structural formula 10.

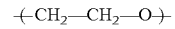    Structural formula 10

The PO unit is any one of, or a plurality of any of, units represented respectively by the following structural formulas 11, 12 and 13.

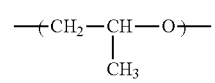    Structural formula 11

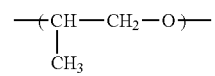    Structural formula 12

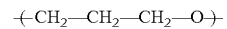    Structural formula 13

The BO unit is any one of, or a plurality of any of, units represented respectively by the following structural formulas 14, 15, 16, 17, 18 and 19.

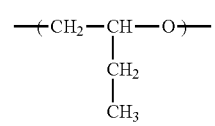    Structural formula 14

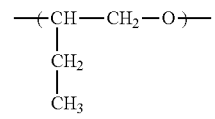    Structural formula 15

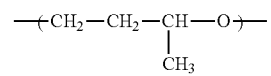    Structural formula 16

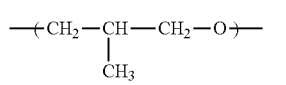
Structural formula 17

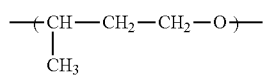
Structural formula 18

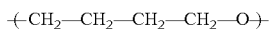
Structural formula 19

The AO unit of any of these can contribute to dissociation between the sulfonate ion ($-SO_3^-$) and the reverse-polarity ion (cation: $Q^+$) in the sulfo unit. The dissociation between the sulfonate ion and the reverse-polarity ion is promoted, and this can make the electrically conducting layer have a low resistance. Also, the AO unit(s) is/are of structure with a relatively high crystallizability, and hence has/have a tendency to make the epichlorohydrin rubber highly crystallizable.

In the present invention, in order to make the electrically conducting layer have resistance in a range appropriate as the electrically conducting member, the AO unit(s) in the epichlorohydrin rubber is/are set to be in a content of from 5% by mass or more to 60% by mass or less in total. If the AO unit(s) is/are in a content of more than 60% by mass in total, the epichlorohydrin rubber may be so much highly crystallizable as to restrain the movement of the reverse-polarity ion, and hence the electrically conducting layer may have a low conductivity. If on the other hand the AO unit(s) is/are in a content of less than 5% by mass, the dissociation between the sulfonate ion ($-SO_3^-$) and the reverse-polarity ion in the sulfo unit may be so insufficient as to make the electrically conducting layer have a low conductivity.

Especially where the electrically conducting layer is desired to be made low-resistance, the AO unit(s) in the epichlorohydrin rubber may preferably be in a content of from 50% by mass or more to 60% by mass or less in total. Also, where it is made much of the smallness in resistance change of the electrically conducting layer in a high-humidity environment and a low-humidity environment, the AO unit(s) may preferably be in a content of from 10% by mass or more to 40% by mass or less in total. Incidentally, the structure and content of each unit in the epichlorohydrin rubber may be determined by $^1$H-NMR and $^{13}$C-NMR.

The constitution of the AO unit(s) may appropriately be selected in accordance with, e.g., the form of charging of any electrophotographic apparatus to be used.

For example, where an electrophotographic apparatus is used which employs what is called a DC (direct current) charging system (hereinafter also simply "DC charging"), in which only a direct voltage is applied to a charging member, the EO unit may preferably be used as the AO unit, from the viewpoint of making the electrically conducting member, stated specifically the charging member, have a low electrical resistance. Also, where it is made much of the smallness in electrical resistance change of the electrically conducting layer in a high-humidity environment and a low-humidity environment, at least one of the PO unit and the BO unit may preferably be used as the AO unit.

As the electrical resistance of the charging member used in the DC charging, it is preferable for the electrically conducting layer to have, stated specifically, a volume resistivity of from $1 \times 10^4$ Ω·cm or more to $1 \times 10^8$ Ω·cm or less. In the case when the EO unit is used as the AO unit, the electrically conducting layer can easily be made to have a low electrical resistance and the electrically conducting layer can easily be made to have its volume resistivity within the above range.

Meanwhile, there is an electrophotographic apparatus of a system in which, together with a direct voltage, an alternating (AC) voltage is superimposedly applied to the charging member (hereinafter also "AC/DC charging"). The AC/DC charging is superior in charge stability to the DC charging, and enables use of, e.g., a charging member having an electrically conducting layer of from $1 \times 10^5$ Ω·cm or more to $1 \times 10^{10}$ Ω·cm or less in volume resistivity.

About the charging member used in the AC/DC charging system, at least one of the PO unit and the BO unit, which are low water-absorptive in a high-humidity environment, may preferably be used as the AO unit(s) in order to keep its electrical resistance value from lowering in excess in the high-humidity environment.

The EO unit, the PO unit and the BO unit may be used as the AO unit(s) in appropriate combination in accordance with the desired characteristics of the electrically conducting member, which may be mixed in a proportion set appropriately.

2) Epichlorohydrin Unit

The ECH unit is a unit represented by the following structural formula 20.

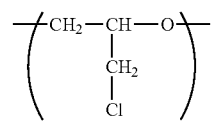
Structural formula 20

The ECH unit has the effect of inhibiting the crystallizability of the epichlorohydrin rubber. In the present invention, the epichlorohydrin rubber contains therein this ECH unit in an amount of 30% by mass or more. As long as the ECH unit is in a content of 30% by mass or more, the sulfonate ion and reverse-polarity ion in the sulfo unit are easily movable to enable the electrically conducting layer to be improved in its conductivity.

3) Unit Having Sulfonate Ion

The sulfo unit may at least have a sulfonate ion in the molecular structure, and may be of any structure other than that.

The electrically conducting layer contains the sulfonate ion ($-SO_3^-$) and the reverse-polarity ion (cation: $Q^+$) which are present in the sulfo unit. More specifically, the epichlorohydrin rubber in the electrically conducting layer may contain a unit having at least one of a sulfo group ($-SO_3^-H^+$) and a sulfonate structure ($-SO_3^-Q^+$). These ions are those which assume the conductivity of the electrically conducting layer.

The reverse-polarity ion may appropriately be selected from any ions known in the field of ion conducting agents, and may include, e.g., alkali metal ions such as proton, lithium ion, sodium ion and potassium ion, and also an imidazolium compound ion, a pyrrolidinium compound ion, a quaternary ammonium compound ion, a pyridinium compound ion and a phosphonium compound ion.

The imidazolium compound ion may specifically include a 1-methylimidazolium ion, a 1-ethylimidazolium ion, a 1-butylimidazolium ion, a 1-octylimidazolium ion, a 1-decylimidazolium ion, a 1,3-dimethylimidazolium ion, a 1-ethyl-3-methylimidazolium ion, a 1-propyl-3-methylimidazolium ion, a 1-butyl-3-methylimidazolium ion, a 1-hexyl-3-methylimidazolium ion, a 1-octyl-3-methylimidazolium ion, a 1-decyl-3-methylimidazolium ion, a 1,3-diethylimidazolium ion, a 1-propyl-3-ethylimidazolium ion, a 1-butyl-3-ethylimidazolium ion, a 1-hexyl-3-ethylimidazolium ion, a 1-octyl-3-ethylimidazolium ion, a 1-decyl-3-ethylimidazolium ion, a 1,2,3-trimethylimidazolium ion, a 1-ethyl-2,3-dimethylimidazolium ion, a 1-propyl-2,3-dimethylimidazolium ion, a 1-butyl-2,3-dimethylimidazolium ion, a 1-hexyl-2,3-dimethylimidazolium ion, a 1-octyl-2,3-dimethylimidazolium ion, a 1-decyl-2,3-dimethylimidazolium ion and a 1-butyl-3-ethylimidazolium ion.

The pyrrolidinium compound ion may specifically include a 1,1-dimethylpyrrolidinium ion, a 1-ethyl-1-methylpyrrolidinium ion, a 1-butyl-1-methylpyrrolidinium ion, a 1-hexyl-1-methylpyrrolidinium ion, a 1-octyl-1-methylpyrrolidinium ion, a 1-decyl-1-methylpyrrolidinium ion, a 1,1-diethylpyrrolidinium ion, a 1-butyl-1-ethylpyrrolidinium ion, a 1-hexyl-1-ethylpyrrolidinium ion, a 1-octyl-1-ethylpyrrolidinium ion, a 1-decyl-1-ethylpyrrolidinium ion and a 1,1-dibutylpyrrolidinium ion.

The quaternary ammonium compound ion may specifically include a tetramethylammonium ion, a tetraethylammonium ion, a tetrabutylammonium ion, a tetrapentylammonium ion, a tetrahexylammonium ion, a tetraoctylammonium ion, a tetradecylammonium ion, a methyltriethylammonium ion, a methyltributylammonium ion, a methyltrioctylammonium ion, a methyltridecylammonium ion, an ethyltrimethylammonium ion, a butyltrimethylammonium ion, a hexyltrimethylammonium ion, an octyltrimethylammonium ion, a decyltrimethylammonium ion, a phenyltrimethylammonium ion, a cyclohexyltrimethylammonium ion, a diallyldimethylammonium ion, a (2-chloroethyl)trimethylammonium ion and a (2-hydroxyethyl)trimethylammonium ion.

The pyridinium compound ion may specifically include an N-methylpyridinium ion, an N-ethylpyridinium ion, an N-butylpyridinium ion, an N-hexylpyridinium ion, an N-octylpyridinium ion, an N-decylpyridinium ion, an N-methyl-3-methylpyridinium ion, an N-ethyl-3-methylpyridinium ion, an N-butyl-3-methylpyridinium ion, an N-hexyl-3-methylpyridinium ion, an N-octyl-3-methylpyridinium ion, an N-decyl-3-methylpyridinium ion, an N-methyl-4-methylpyridinium ion, an N-ethyl-4-methylpyridinium ion, an N-butyl-4-methylpyridinium ion, an N-hexyl-4-methylpyridinium ion, an N-octyl-4-methylpyridinium ion, an N-decyl-4-methylpyridinium ion, an N-methyl-3,4-dimethylpyridinium ion, an N-ethyl-3,4-dimethylpyridinium ion, an N-butyl-3,4-dimethylpyridinium ion, an N-hexyl-3,4-dimethylpyridinium ion, an N-octyl-3,4-dimethylpyridinium ion, an N-decyl-3,4-dimethylpyridinium ion, an N-methyl-3,5-dimethylpyridinium ion, an N-ethyl-3,5-dimethylpyridinium ion, an N-butyl-3,5-dimethylpyridinium ion, an N-hexyl-3,5-dimethylpyridinium ion, an N-octyl-3,5-dimethylpyridinium ion and an N-decyl-3,5-dimethylpyridinium ion.

The phosphonium compound ion may specifically include a tetramethylphosphonium ion, a tetraethylphosphonium ion, a tetrabutylphosphonium ion, a tetrapentylphosphonium ion, a tetrahexylphosphonium ion, a tetraoctylphosphonium ion, a tetradecylphosphonium ion, a methyltriethylphosphonium ion, a methyltributylphosphonium ion, a methyltrioctylphosphonium ion, a methyltridecylphosphonium ion, an ethyltrimethylphosphonium ion, a phenyltrimethylphosphonium ion, a hexyltrimethylphosphonium ion, an octyltrimethylphosphonium ion, a decyltrimethylphosphonium ion, a butyltrimethylphosphonium ion, a cyclohexyltrimethylphosphonium ion, a (2-chloroethyl)trimethylphosphonium ion and a (2-hydroxyethyl)trimethylphosphonium ion.

These reverse-polarity ions are present in a plurality of kinds in some cases.

In the present invention, the epichlorohydrin rubber contains therein this sulfo unit, and hence it follows that the electrically conducting layer has a structure wherein the sulfonate ion is set bonding (stationary) in the epichlorohydrin rubber. Hence, the cation and anion in the ion conducting agent can be more kept than ever from coming localized and, as the result, the electrically conducting member can be kept from coming to vary in electrical resistance when a direct current is applied thereto. Also, the anion (sulfonate ion) is set stationary in the epichlorohydrin rubber, and hence, compared with conventional cases, this can keep the ion conducting agent from bleeding to the surface of the electrically conducting member and the photosensitive member from being contaminated because of such bleeding.

The sulfo unit may preferably have a structure wherein the chlorine atom in the epichlorohydrin unit has been substituted with a group (molecular chain) having a sulfonate ion.

The sulfo unit may, e.g., be a unit represented by the following structural formula 1. In the case when the sulfo unit is represented by this structural formula 1, the "($-R^1-SO_3^--$)" moiety in the structural formula 1 corresponds to the above group having a sulfonate ion.

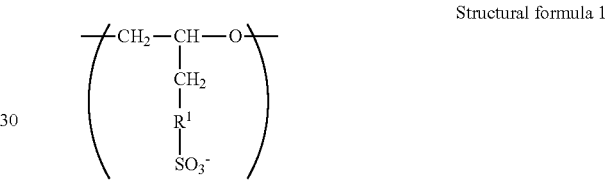

Structural formula 1

In the structural formula 1, $R^1$ represents a unit selected from the group consisting of units represented respectively by the following structural formulas 2 to 4.

Structural formula 2

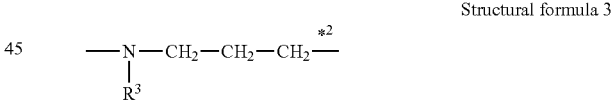

Structural formula 3

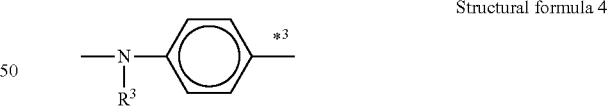

Structural formula 4

In the structural formulas 2 to 4, $R^2$, $R^3$ and $R^4$ each independently represent a hydrogen atom or an methyl group, and asterisks *1 to *3 each represent the position of bonding with the $SO_3^-$ in the structural formula 1.

The sulfo unit in the epichlorohydrin rubber used in the present invention may preferably be in a content of from 0.01 mol % or more to 2.0 mol % or less in order to bring out the conductivity required as the electrically conducting member. Incidentally, in the case when the sulfo unit has the structure wherein the chlorine atom in the ECH unit has been substituted with a group (molecular chain) having a sulfonate ion, the structure and content of the ECH unit and sulfo unit in the epichlorohydrin rubber may be determined by $^1$H-NMR and $^{13}$C-NMR.

4) Other Unit(s)

In addition to the AO unit(s), ECH unit and sulfo unit, the epichlorohydrin rubber may have other unit in the molecular structure. Such other unit may include, e.g., an allyl glycidyl ether unit. This allyl glycidyl ether unit is a unit represented by the following structural formula 21.

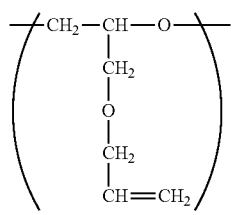

Structural formula 21

Having such an allyl glycidyl ether unit enables the epichlorohydrin rubber to be vulcanized with sulfur. The allyl glycidyl ether unit in the epichlorohydrin rubber may preferably be in a content of 20 mol % or less from the viewpoint of the conductivity of the epichlorohydrin rubber.

Other unit beside the foregoing may also include, e.g., the following unit. That is, it may include a unit represented by the structural formula 9 given later (a unit having a structure wherein the chlorine atom in the ECH unit has been substituted with hexylamine).

Various Compounding Agents

The electrically conducting layer used in the present invention may optionally contain any other compounding agents as long as they do not damage the function of the above substance (epichlorohydrin rubber). Such compounding agents may include, e.g., a filler, a plasticizer, a vulcanizing agent, an acid acceptor, an antioxidant, a vulcanization retarder and a processing aid.

-How to Produce Electrically Conducting Member-

How to produce the above epichlorohydrin rubber The epichlorohydrin rubber used in the present invention may be one synthesized by any method as long as it is composed as described above.

For example, a method is available in which at least one AO unit of the EO unit, PO unit and BO unit, the ECH unit and the material for forming the sulfo unit are copolymerized.

A method is also available which has the following steps.
I) The step of copolymerizing at least i) at least one AO of EO, PO and BO and ii) ECH to obtain a copolymer; and
II) the step of introducing the sulfonate ion into the ECH unit in this copolymer to obtain the epichlorohydrin rubber.

That is, the epichlorohydrin rubber in the electrically conducting layer of the present invention may be a rubber produced by beforehand copolymerizing at least i) at least one AO of EO, PO and BO and ii) ECH to obtain a copolymer and thereafter introducing the sulfonate ion into the ECH unit in this copolymer.

As a method for introducing the sulfonate ion into the ECH unit in the copolymer, the following method is available, for example. That is, it is a method in which the chlorine atom in the ECH unit of this copolymer is substituted with a molecular chain having a sulfonate ion.

This molecular chain having a sulfonate ion may include, e.g., an amine compound having a sulfonate ion, an alcohol having a sulfonate ion and a thiol having a sulfonate ion.

The amine compound having a sulfonate ion may include 2-aminoethylsulfonic acid, 3-aminopropylsulfonic acid and aminobenzylsulfonic acid. Also, the alcohol having a sulfonate ion may include 2-hydroxyethyl methanesulfonate, 6-hydroxy-2-naphthalenesulfonic acid and sodium 4-hydroxybenzenesulfonate. Further, the thiol having a sulfonate ion may include sodium 3-mercapto-1-propanesulfonate.

Of these, a method in which the chlorine atom in the epichlorohydrin unit of this copolymer is substituted with the amine compound having a sulfonate ion is preferable in view of readiness of reaction.

How to Form Electrically Conducting Layer

As a method for forming the electrically conducting layer, a method is available in which a rubber composition prepared as a raw material for the electrically conducting layer is shaped or molded by a known method such as extrusion, injection molding or compression molding. The electrically conducting layer may also be directly formed on the electrically conducting substrate, or may be formed by covering the electrically conducting substrate with an electrically conducting layer beforehand formed in the shape of a tube. Incidentally, after the electrically conducting layer has been formed, it is preferable to sand the surface of the electrically conducting layer so as to adjust its shape.

Where the electrically conducting member is used as a charging roller, from the viewpoint of securing close contact between the charging roller and the photosensitive member the electrically conducting layer may preferably be so formed that the roller is in a crown shape in which it is largest in diameter at the middle portion and becomes smaller in diameter as it comes to the both ends. The charging roller is usually kept in contact with the photosensitive member by applying a stated pressing force to the electrically conducting substrate (shaft member) at its both end portions. That is, the pressing force is small at the middle portion and becomes larger toward the both end portions. Hence, as long as the shape of the charging roller is such a crown shape, any density non-uniformity on images that corresponds to the middle portion and the both end portions can be kept from occurring even where the charging roller has an insufficient straightness.

From the viewpoint of the uniformity in contact nip width at the time of roller rotation, it is also preferable for the charging roller to have an outer diameter deflection as small as possible.

-Process Cartridge-

The process cartridge according to the present invention is a process cartridge usable in electrophotographic apparatus (process cartridge for electrophotography), and is so set up as to be detachably mountable to the main body of an electrophotographic apparatus. This process cartridge also has at least the electrically conducting member of the present invention as any of, e.g., a charging member and a developing member.

Figure 3:
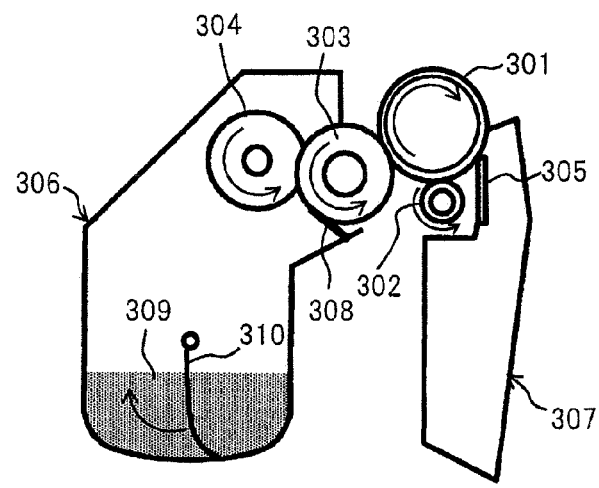
FIG. 3 is a schematic view showing an example of a process cartridge making use of the electrically conducting member of the present invention.

The process cartridge according to the present invention may have either or both of a developing assembly and a charging assembly that are necessary for image formation. FIG. 3 is a schematic view showing an example of the process cartridge of the present invention.

The developing assembly shown in FIG. 3 has a developing roller 303, a toner feed roller 304 which feeds a toner to the developing roller, and a developing blade 308 which controls the toner on the developing roller in a uniform state. This developing assembly further has a toner 309, an agitating blade 310 which agitates the toner, and a toner container (developer container) 306 which holds the toner therein. This developing roller 303 is a contact type developing roller, which is disposed in contact with a photosensitive member 301, and by the aid of which toner images are formed on the photosensitive member by development.

The charging assembly also shown in FIG. 3 forms a part of what is constituted of the photosensitive member 301, a charging roller 302 which charges the photosensitive member electrostatically, a cleaning blade 305 which removes a residual toner and so forth present on the photosensitive member 301, and a waste toner container 307 in which the toner collected is held.

In this process cartridge, the photosensitive member 301 is rotatingly driven at a stated peripheral speed (process speed) in the direction shown by an arrow (clockwise as viewed in the drawing). The charging roller 302 is pressed against the photosensitive member 301 at a stated force so as to be disposed in contact therewith, and is follow-up rotated as the photosensitive member 301 is rotated, where it charges the photosensitive member 301 electrostatically to a stated potential, with application of a stated direct voltage from a charging power source (not shown). On the photosensitive member 301, latent images are formed by the aid of exposure light (not shown). As a unit which emits the exposure light, an exposure unit such as a laser beam scanner is used, for example. The photosensitive member 301 having been uniformly charged is exposed to light corresponding to image information, whereby electrostatic latent images are formed thereon.

Using a toner having electrostatically been processed to have the same polarity as the polarity of the photosensitive member, the electrostatic latent images are developed to be rendered visible into toner images. The cleaning blade 305 mechanically scrapes off any transfer residual toner remaining on the photosensitive member 301 after the toner images have been transferred therefrom, and collects it into the waste toner container. Here, a cleaning-at-development system which collects the transfer residual toner may be employed so as to omit the cleaning blade 305 and the waste toner container 307.

-Electrophotographic Apparatus-

The electrophotographic apparatus of the present invention has the electrically conducting member of the present invention, having been described above, as any of, e.g., a charging member, a developing member and a transfer member. Also, the process cartridge described above may be detachably mounted to the main body of this electrophotographic apparatus.

Figure 2:
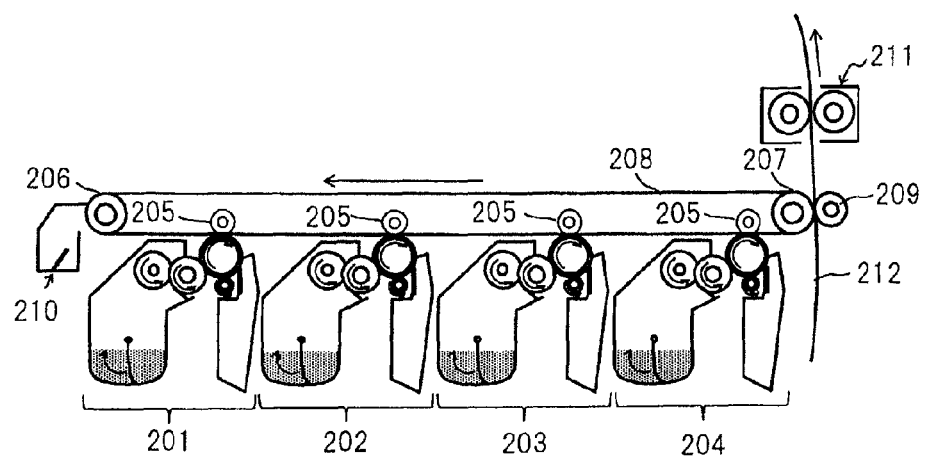
FIG. 2 is a schematic view showing an example of an electrophotographic apparatus making use of the electrically conducting member of the present invention.

A schematic view of the electrophotographic image forming apparatus of the present invention is presented in FIG. 2. This electrophotographic apparatus is constituted of four-color process cartridges 201 to 204, primary transfer rollers 205 which transfer toner images held on photosensitive members, to an intermediate transfer belt 208, a secondary transfer roller 209 which transfers the toner images to a transfer material 212, a fixing assembly 211 which fixes the toner images thereto, and so forth.

The toner images formed as a result of the development by the above process cartridges 201 to 204 are transferred onto the intermediate transfer belt 208 by means of the primary transfer rollers 205; the former being supported on and driven through a tension roller 206 and an intermediate transfer belt drive roller 207. The toner images having been transferred onto the intermediate transfer belt 208 are further transferred to the transfer material 212 such as plain paper by the aid of the secondary transfer roller 209. Here, the transfer material 212 is transported by a paper feed system (not shown) having a transport member. The fixing assembly 211 is constituted of a heated roller and so forth, and fixes to the transfer material 212 the toner images having been transferred thereto, where the transfer material with fixed images are put out of the machine. Incidentally, any toners remaining on the intermediate transfer belt without being transferred are also scraped off by means of a cleaning unit (intermediate transfer belt cleaner) 210.

EXAMPLES

As polymers for producing epichlorohydrin rubbers used in the present invention, polymers shown in Table 1 below were readied.

TABLE 1

| Polymer | Manufacturer; trade name |
|---|---|
| A | Daiso Co., Ltd.; EPION 301 |
| B | Daiso Co., Ltd.; EPICHLOMER CG102 |
| C | Daiso Co., Ltd.; EPICHLOMER CG104 |
| D | Nippon Zeon Co., Ltd.; ZECRON 3100 |
| E | Daiso Co., Ltd.; EPICHLOMER CG105 |
| F | Daiso Co., Ltd.; EPICHLOMER CG107 |
| G | Daiso Co., Ltd.; EPICHLOMER C |
| H | Daiso Co., Ltd.; EPICHLOMER D |
| I | Daiso Co., Ltd.; EPICHLOMER CG |
| J | Daiso Co., Ltd.; EPICHLOMER DG |
| K | Synthesis Example 1 |
| L | Synthesis Example 2 |
| M | Synthesis Example 3 |
| N | Synthesis Example 4 |
| O | Synthesis Example 5 |
| P | Synthesis Example 6 |
| Q | Synthesis Example 7 |

As additives for producing the epichlorohydrin rubbers used in the present invention, additives shown in Table 2 below were also readied.

TABLE 2

| Additive | Material name |
|---|---|
| 1 | Sodium 2-aminoethanesulfonate |
| 2 | Sodium 3-aminopropanesulfonate |
| 3 | Sodium aminobenzenesulfonate |
| 4 | Sodium 4-hydroxybenzenesulfonate |
| 5 | Hexylamine |

Synthesis Example 1

Production of Polymer K:
The above polymer K was produced by the following procedure.

Preparation of Catalyst Solution

An autoclave of 1 liter in internal volume and with a stirrer was dried, and its inside was displaced with nitrogen. Into this autoclave, 52.9 g of tributylaluminum, 390 g of toluene and 98.8 g of diethyl ether were introduced, and then stirred while keeping the liquid temperature at 30° C. Further, with stirring continued, 7.8 g of orthophosphoric acid was slowly added to the mixture solution obtained. Subsequently, 4.0 g of triethylamine was added thereto. Thereafter, the mixture obtained was continued being stirred at 60° C. for 2 hours to obtain a catalyst solution.

Polymerization for Raw-material Polymer

An autoclave of 3 liters in internal volume and with a stirrer was dried, and its inside was displaced with nitrogen. Into this autoclave, 1,260 g of n-hexane and 43.9 g of the above catalyst solution were introduced, and then stirred while keeping the liquid temperature at 30° C. Then, as a monomer 1, 7.5 g of ethylene oxide was added to carry out first-stage reaction.

Subsequently, 7.8 g of ethylene oxide as a monomer 2, 226.9 g of epichlorohydrin as a monomer 3, 9.9 g of allyl glycidyl ether as a monomer 4 and 100 g of n-hexane were mixed together. The mixture solution obtained was introduced into the autoclave continuously over a period of 6 hours; the autoclave containing the first-stage reaction solution. On that occasion, the liquid temperature in the autoclave was regulated to 60° C. Having been finished being introduced, stirring was further continued for 2 hours to carry out second-stage reaction. The reaction solution obtained was vacuum-dried, further followed by washing to obtain a polymer K, one of raw materials for the epichlorohydrin rubber.

Synthesis Examples 2 to 7

Production of Polymers L to Q:
Polymers L to Q were obtained in the same way as Synthesis Example 1 except that the types and amounts of the monomers 1 to 4 added were changed as shown in Table 3. The types A to E of the monomers as entered in Table 3 are shown in Table 4.

TABLE 3

| Synthesis Example | Monomer 1 | Amt. (g) | Monomer 2 | Amt. (g) | Monomer 3 | Amt. (g) | Monomer 4 | Amt. (g) |
|---|---|---|---|---|---|---|---|---|
| 1 | A | 7.5 | A | 7.8 | B | 226.9 | C | 9.9 |
| 2 | D | 7.5 | D | 143.2 | B | 84.6 | C | 16.7 |
| 3 | E | 7.5 | E | 130 | B | 100.8 | C | 14.2 |
| 4 | D | 7.5 | D | 103.1 | B | 125.9 | C | 15.5 |
| 5 | E | 7.5 | E | 80.4 | B | 154 | C | 10.2 |
| 6 | D | 7.5 | D | 12.2 | B | 222.6 | C | 9.7 |
| 7 | D | 7.5 | D | 35.2 | B | 182.4 | C | 26.9 |

TABLE 4

| Monomer | Material name |
|---|---|
| A | Ethylene oxide (EO) |
| B | Epichlorohydrin (ECH) |
| C | Allyl glycidyl ether |
| D | Propylene oxide (PO) |
| E | Butylene oxide (BO) |

Example 1

Production of Epichlorohydrin

Using the polymer A shown in Table 1 and the additive 1 shown in Table 2, epichlorohydrin was produced.

Stated specifically, 300 g of the polymer A was dissolved in 1,000 ml of N,N-dimethylformamide. Next, 1.5 g of the additive 1 was dissolved in 100 ml of ion-exchanged water. Then, the resultant aqueous solution of the additive 1 standing dissolved therein was mixed in the resultant N,N-dimethylformamide solution of the polymer A standing dissolved therein, followed by heating and stirring at 50° C. for 12 hours in an atmosphere of nitrogen. A solution of the reaction product obtained on completing the heating and stirring was concentrated to dryness by means of an evaporator to obtain a reaction product. The reaction product obtained was washed with ion-exchanged water to obtain an epichlorohydrin rubber 1.

Composition of the epichlorohydrin rubber 1 obtained was ascertained by proton NMR and carbon NMR. As the result, this epichlorohydrin rubber 1 was found to contain as AO units 55.3% by mass of the EO unit and 36.3% by mass of the ECH unit, 0.6% by mass of the sulfo unit and 7.8% by mass of the allyl glycidyl ether. Here, this sulfo unit was a unit represented by the following structural formula 5.

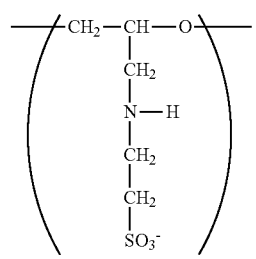

Structural formula 5

Preparation of Unvulcanized Rubber Composition

Materials the types and amounts of which are shown in Table 5 below were mixed by means of a pressure kneader, and thereafter further mixed by means of an open roll to prepare an unvulcanized rubber composition 1.

TABLE 5

| Materials | Amount [part(s) by mass] |
|---|---|
| Above epichlorohydrin rubber 1 | 100 |
| Zinc oxide (Zinc Oxide Type II, available from Seido Chemical Industry Co.) | 5 |
| Calcium carbonate (trade name: SILVER W; available from Shiraishi Calcium Kaisha, Ltd.) | 35 |
| Carbon black (trade name: SEAST SO; available from Tokai Carbon Co., Ltd.) | 8 |
| Stearic acid as processing aid | 2 |
| Adipate as plasticizer (trade name: POLYCIZER W305ELS, available from Dainippon Ink & Chemicals, Inc.) | 10 |
| Sulfur as vulcanizing agent | 0.5 |
| Dipentamethylenethiuram tetrasulfide as cross-linking aid (trade name: NOCCELER TRA; available from Ouchi-Shinko Chemical Industrial Co. Ltd.) | 2 |

Production of electrically conducting elastic roller: A columnar rod of 252 mm in whole length and 6 mm in outer diameter was readied which was made of free-cutting steel and treated by electroless nickel plating on its surface. Next, a conductive adhesive was coated on this round rod on its portion excluding 11 mm each of both end portions, by means of a roll coater. As the adhesive, a conductive hot-melt type adhesive was used. In Example 1, the columnar rod thus coated with the adhesive was used as an electrically conducting substrate.

Next, a crosshead extruder having an electrically conducting substrate feed mechanism and an unvulcanized rubber roller discharge mechanism was readied, and a die of 12.5 mm in inner diameter was attached to the crosshead, where the extruder and the crosshead were set at 80° C. and electrically conducting substrate transport speed was regulated to 60 mm/sec. Under these conditions, the unvulcanized rubber composition 1 was so fed from the extruder as to obtain an electrically conducting substrate covered on its surface with the unvulcanized rubber composition 1.

Next, this electrically conducting substrate covered on its surface with the unvulcanized rubber composition was introduced into a 170° C. hot-air vulcanizing oven, and heated therein for 60 minutes to form an elastic roller on this electrically conducting substrate. Thereafter, end portions of the elastic layer were so cut and removed that the elastic layer was 228 mm in length in the axial direction of the electrically conducting substrate. Finally, the surface of the elastic layer was sanded with a rotary grinding wheel. Thus, an electrically conducting elastic roller was obtained which was 8.4 mm in diameter at each position of 90 mm from the middle thereof to both end portions and 8.5 mm in diameter at the middle portion. In Example 1, this elastic layer corresponds to the electrically conducting layer used in the present invention.

Production of Electrically Conducting Roller

Subsequently, on the peripheral surface of the above electrically conducting elastic roller, a surface layer was formed by using the following surface layer forming coating material.

Stated specifically, first, to a caprolactone modified acrylic polyol solution, methyl isobutyl ketone was added to control the former's solid content so as to be 18% by mass. Using materials shown in Table 6 below, including 555.6 parts by mass (solid content: 100 parts by mass) of this solution, a mixture solution was prepared. At this point, a mixture of the blocked HDI and the blocked IPDI was so added as to be "NCO/OH=1.0".

TABLE 6

| Materials | Amount [part(s) by mass] |
|---|---|
| Caprolactone modified acrylic polyol solution (trade name: PLACCEL DC2016; available from Daicel Chemical Industries, Ltd.) | 100 (solid content) |
| Carbon black (HAF) | 16 |
| Acicular rutile-type fine titanium oxide particles (having been surface-treated with hexamethylenedisilazane and dimethylsilicone; average particle diameter: 0.015 μm; length/breadth = 3:1) | 35 |
| Modified dimethylsilicone oil | 0.1 |
| 7:3 (NCO ratio) mixture of hexamethylene diisocyanate (HDI) and isophorone diisocyanate (IPDI) each blocked with butanone oxime | 80.14 |

Next, 210 g of the above mixture solution and 200 g of glass beads of 0.8 mm in volume-average particle diameter as dispersion media were mixed in a 450 ml glass bottle, followed by dispersion for 24 hours by using a paint shaker dispersion machine. After the dispersion was completed, cross-linked type acrylic particles "MR50G" (trade name; available from Soken Chemical & Engineering Co., Ltd.) as resin particles were added in an amount of 5.44 parts by mass (corresponding to 20 parts by mass based on 100 parts by mass of the acrylic polyol), followed by further dispersion for 30 minutes to obtain a surface layer coating material.

The above electrically conducting elastic roller was coated with this surface layer coating material by one-time dipping. Then, the coat formed was air-dried at normal temperature for 30 minutes or more, then dried for 1 hour by means of a circulating hot-air drier set at 90° C., and further dried for 1 hour by means of a circulating hot-air drier set at 160° C., thus a surface layer was formed on the peripheral surface of the electrically conducting elastic roller to produce an electrically conducting of Example 1. The dip-coating was so controlled as for dipping time to be 9 seconds, and for dipping draw-up speed to be 20 mm/sec in initial-stage speed and 2 mm/sec in final speed, and the speed of from 20 mm/sec to 2 mm/sec was changed linearly with respect to time.

The electrically conducting roller thus obtained was evaluated by the following method.

Measurement of Electric Current

To ascertain electrical characteristics of the electrically conducting roller in each environment, electric current was measured. It is preferable for the electrically conducting roller to exhibit electrical characteristics required in an N/N environment described later and to be small in electrical characteristics between an L/L environment and an H/H environment which are described later.

Figure 4A:
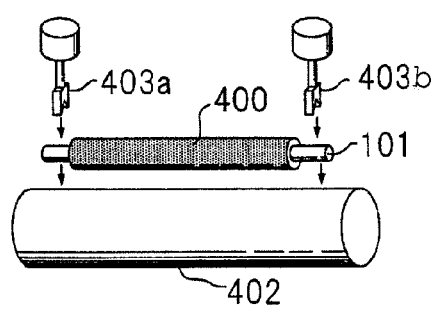
FIG. 4A is a schematic view of an electrical resistance measuring instrument usable in measuring the electrical resistance value of the electrically conducting member of the present invention.
Figure 4B:
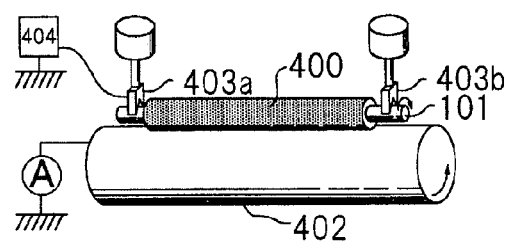
FIG. 4B is a schematic view of the electrical resistance measuring instrument at the time of measuring the electrical resistance value of the electrically conducting member of the present invention.

Stated specifically, the electric current was measured with an electrically conducting roller current value measuring instrument shown in FIGS. 4A and 4B. In the current measuring instrument shown in FIGS. 4A and 4B, a stress that presses an electrically conducting mandrel 101 of an electrically conducting roller 400 vertically downward is kept applied to its both end portions through bearings 403a and 403b fastened to weights. Vertically downward to this electrically conducting roller 400, a columnar metal 402 is disposed in parallel to the electrically conducting roller 400. The curvature of this columnar metal 402 is set at the same curvature of the photosensitive member of an electrophotographic apparatus to be used.

As shown in FIG. 4B, this electrically conducting roller is brought into contact with the columnar metal through the bearings under the same load as that used actually in the electrophotographic apparatus. Then, the columnar metal 402 is rotated at the same rotational speed as the photosensitive drum in use and, while the electrically conducting roller 400 is follow-up rotated, a direct voltage of −200 V is applied by a powder source 404.

In the present invention, 2 seconds after this direct voltage was applied, the time average of electric currents flowing out of the columnar metal 402 was measured with an ammeter A. Stated specifically, the time average value of current values measured for 5 seconds was taken as the initial-stage current value. The measurement was made in each of an environment of temperature 15° C. and humidity 10% RH (relative humidity) (L/L), an environment of temperature 30° C. and humidity 80% RH(H/H) and an environment of temperature 23° C. and humidity 50% RH(N/N). In Example 1, the electrically conducting roller was left to stand for 48 hours or more in the environment where the electric current was to be measured and evaluated, and thereafter evaluated.

Here, the value of (initial-stage current value in H/H)/(initial-stage current value in L/L) was taken as environmental dependence. The results of evaluation are shown in Table 11.

Evaluation on Resistance Variation after Application of Direct Current

To make evaluation on how much the electrical resistance value may vary due to the application of a direct current, the following test was conducted.

First, like the measurement of electric current, the electrically conducting roller was placed on the current value measuring instrument. In the evaluation on electrical resistance variations due to the application of a direct current, the columnar metal was not rotated, where a direct current of 450 μA was applied thereto for 30 minutes by the powder source 404. This corresponds to electric current in printing on about 20,000 sheets. Thereafter, the electric current was measured.

In the evaluation, the value of 'current value after test (current value after application)/current value before test (initial-stage current value)' was taken as current variation rate. In Example 1, the test was conducted after the electrically conducting roller was left to stand for 48 hours or more in an environment of temperature 23° C. and humidity 50% RH (hereinafter also "N/N environment"). The test itself was also conducted in the N/N environment. The results of evaluation are shown in Table 11.

Image Evaluation

The electrically conducting roller having come to vary in electrical resistance due to the application of the direct current was used as a charging roller, where, in order to ascertain any influence of such variations on the grade of electrophotographic images, electrophotographic images were formed and evaluated as described below.

First, using the current value measuring instrument shown in FIGS. 4A and 4B, a direct current of 450 μA was applied to the electrically conducting roller for 1,000 minutes. This corresponds to the amount of electric current applied to the electrically conducting roller when the electrophotographic images were reproduced on about 670,000 sheets where the electrically conducting roller was used as the charging roller.

After application of the electric current, this electrically conducting roller was incorporated as a charging roller into a process cartridge for an electrophotographic laser beam printer (trade name: LBP5400; manufactured by CANON INC.), and this process cartridge was mounted to the laser beam printer to reproduce halftone images. Herein, the halftone images are images in which horizontal lines were each drawn in a width of 1 dot and at intervals of 2 dots in the direction perpendicular to the rotational direction of the photosensitive drum. The halftone images obtained were visually observed to make evaluation according to the following criteria. The results of evaluation are shown in Table 11.

A: Any horizontal streaky images are not seen.
B: Slight horizontal streaky lines are seen in some part.
C: Slight horizontal streaky lines are seen over the whole area.
D: Serious horizontal streaky lines are seen, and are conspicuous.

Evaluation on Bleeding

Whether or not any bleeding from the electrically conducting roller occurred due to long-term service was examined. The electrically conducting roller produced was brought into contact with a polyethylene terephthalate (PET) sheet (both-end loading of a load of 500 g per each one-side end of the shaft member) in an environment of temperature 40° C. and humidity 95% RH, and this was left to stand for 2 months, where the surface of the PET sheet was observed on an optical microscope (10 magnifications). Whether or not any bled matter from the electrically conducting roller adhered to the sheet surface was observed to make evaluation according to the following criteria. The results of evaluation are shown in Table 11.

A: Any bleeding is not observed on the PET sheet surface.
B: Slight bleeding is observed on some part of the PET sheet surface.
C: Bleeding is observed on the PET sheet surface, and is conspicuous.

Examples 2-6, 8-10, 12-15, 18-23, 25-36

Epichlorohydrin rubbers were produced in the same way as Example 1 except that, in Example 1, the type and amount of the polymer added and the type and amount of the additive added were changed as those shown in Table 7 below. Using this rubber, an electrically conducting roller was produced in the same way as Example 1. The results of evaluation are shown in Table 11.

TABLE 7

| | Polymer | | Additive(s) | | | |
|---|---|---|---|---|---|---|
| | Type | Amount (g) | Type | Amount (g) | Type | Amount (g) |
| Example 1 | A | 300 | 1 | 1.5 | — | — |
| Example 2 | A | 300 | 1 | 0.4 | — | — |
| Example 3 | B | 300 | 1 | 1.5 | — | — |
| Example 4 | B | 300 | 1 | 7.3 | — | — |
| Example 5 | B | 300 | 2 | 1.6 | — | — |
| Example 6 | B | 300 | 3 | 1.8 | — | — |
| Example 7 | B | 300 | 4 | 2.1 | — | — |
| Example 8 | C | 300 | 2 | 1.6 | — | — |
| Example 9 | D | 300 | 1 | 1.5 | — | — |
| Example 10 | D | 300 | 3 | 1.8 | — | — |
| Example 11 | D | 300 | 4 | 2.1 | — | — |
| Example 12 | E | 300 | 1 | 1.5 | — | — |
| Example 13 | E | 300 | 2 | 1.6 | — | — |
| Example 14 | E | 300 | 3 | 1.8 | — | — |
| Example 15 | F | 300 | 3 | 1.8 | — | — |
| Example 16 | G | 300 | 4 | 2.1 | — | — |
| Example 17 | H | 300 | 2 | 1.6 | — | — |
| Example 18 | I | 300 | 1 | 1.5 | — | — |
| Example 19 | J | 300 | 1 | 1.5 | — | — |
| Example 20 | J | 300 | 1 | 0.4 | — | — |
| Example 21 | J | 300 | 1 | 7.3 | — | — |
| Example 22 | J | 300 | 2 | 1.6 | — | — |
| Example 23 | J | 300 | 3 | 1.8 | — | — |
| Example 24 | J | 300 | 4 | 2.1 | — | — |
| Example 25 | K | 300 | 1 | 1.5 | — | — |
| Example 26 | K | 300 | 1 | 7.3 | — | — |
| Example 27 | J | 300 | 1 | 1.5 | 5 | 47.6 |
| Example 28 | K | 300 | 1 | 1.5 | 5 | 69.5 |
| Example 29 | D | 300 | 1 | 1.5 | 5 | 110.9 |
| Example 30 | L | 300 | 1 | 1.5 | — | — |
| Example 31 | M | 300 | 1 | 1.5 | — | — |
| Example 32 | N | 300 | 1 | 1.5 | — | — |
| Example 33 | O | 300 | 1 | 1.5 | — | — |
| Example 34 | P | 300 | 1 | 1.5 | — | — |
| Example 35 | M | 300 | 1 | 1.5 | 5 | 18.8 |
| Example 36 | Q | 300 | 1 | 1.5 | 5 | 106.3 |

Example 7

300 g of the polymer B and 2.1 g of the additive 4 were dissolved in 1,000 ml of N,N-dimethylformamide. With stirring continued, 0.24 g of sodium hydride was little by little added to the resultant solution in an atmosphere of nitrogen. The solution obtained was further stirred at 50° C. for 12 hours in an atmosphere of nitrogen. A solution of the reaction product obtained was concentrated to dryness by means of an evaporator to obtain a reaction product. The reaction product obtained was washed with ion-exchanged water to obtain an epichlorohydrin rubber 7. An electrically conducting roller was produced in the same way as Example 1 except that this rubber 7 was used instead. The results of evaluation are shown in Table 11.

Examples 11, 24

Epichlorohydrin rubbers were produced in the same way as Example 7 except that, in Example 7, the type of the polymer added was changed to those shown in Table 7. Then, using this rubber, an electrically conducting roller was produced in the same way as Example 1. The results of evaluation are shown in Table 11.

Example 16

In Example 7, the type of the polymer was changed to the one shown in Table 7, to obtain an epichlorohydrin rubber 16. Subsequently, materials the types and amounts of which are shown in Table 8 below were mixed by means of a pressure kneader, and thereafter further mixed by means of an open roll to prepare an unvulcanized rubber composition 2.

TABLE 8

| Materials | Parts by mass] |
|---|---|
| Above epichlorohydrin rubber 16 | 100 |
| Dicumyl peroxide | 5 |
| Calcium carbonate (trade name: SILVER W; available from Shiraishi Calcium Kaisha, Ltd.) | 35 |
| Carbon black (trade name: SEAST SO; available from Tokai Carbon Co., Ltd.) | 8 |
| Stearic acid as processing aid | 2 |
| Adipate as plasticizer (trade name: POLYCIZER W305ELS, available from DIC Corporation) | 10 |

Subsequently, an electrically conducting substrate covered on its surface with the unvulcanized rubber composition 2 was obtained in the same way as Example 1. The electrically conducting substrate obtained, covered on its surface with the unvulcanized rubber composition 2, was vulcanized in a 160° C. steam for 40 minutes by means of a steam vulcanizer to form an elastic roller on the electrically conducting substrate. Thereafter, end portions of the elastic layer were so cut and removed that the elastic layer was 228 mm in length in the axial direction of the electrically conducting substrate. Finally, the surface of the elastic layer was sanded with a rotary grinding wheel. Thus, an electrically conducting elastic roller was obtained which was 8.4 mm in diameter at each position of 90 mm from the middle thereof to both end portions and 8.5 mm in diameter at the middle portion. In Example 16, this elastic layer corresponds to the electrically conducting layer according to the present invention.

Further, a surface layer was formed on the peripheral surface of the electrically conducting elastic roller in the same way as Example 1 to obtain an electrically conducting roller. The results of evaluation are shown in Table 11.

Example 17

An epichlorohydrin rubber was obtained in the same way as Example 1 except that, in Example 1, the type and amount of the polymer added and the type and amount of the additive added were changed as those shown in Table 7. Then, an electrically conducting roller was produced in the same way as Example 16 except that this rubber was used instead. The results of evaluation are shown in Table 11.

Example 37

In Example 3, the electrically conducting elastic roller obtained was put to ultrasonic cleaning in pure water for 1 hour. This was further put to ultrasonic cleaning in isopropyl alcohol for 1 hour to carry out cleaning sufficiently. The electrically conducting elastic roller obtained was evaluated as an electrically conducting roller for each item. Here, any surface layer was not formed on this electrically conducting elastic roller. Since any surface layer was not formed, the roller has environmental dependence in a large value, which, however, is a good value for such an electrically conducting elastic roller having no surface layer. The results of evaluation are shown in Table 11.

Comparative Example 1

Materials the types and amounts of which are shown in Table 9 below were mixed by means of a pressure kneader, and thereafter further mixed by means of an open roll to prepare an unvulcanized rubber composition 3. An electrically conducting roller was produced in the same way as Example 1 except that this unvulcanized rubber composition 3 was used in place of the unvulcanized rubber composition 1. Further, a surface layer was formed on the peripheral surface of the electrically conducting elastic roller in the same way as Example 1 to obtain an electrically conducting roller. The results of evaluation are shown in Table 11.

TABLE 9

| Materials | Amount [part(s) by mass] |
|---|---|
| Above polymer A | 100 |
| Zinc oxide (Zinc Oxide Type II, available from Seido Chemical Industry Co.) | 5 |
| Tetrabutylammonium perchlorate | 5 |
| Calcium carbonate (trade name: SILVER W; available from Shiraishi Calcium Kaisha, Ltd.) | 35 |
| Carbon black (trade name: SEAST SO; available from Tokai Carbon Co., Ltd.) | 8 |
| Stearic acid as processing aid | 2 |
| Adipate as plasticizer (trade name: POLYCIZER W305ELS, available from Dainippon Ink & Chemicals, Inc.) | 10 |
| Sulfur as vulcanizing agent | 0.5 |
| Dipentamethylenethiuram tetrasulfide as cross-linking aid (trade name: NOCCELER TRA; available from Ouchi-Shinko Chemical Industrial Co. Ltd.) | 2 |

Example 38

An electrically conducting substrate covered on its surface with the unvulcanized rubber composition 1 was obtained in the same way as Example 1 except that, in Example 1, the whole length of the electrically conducting substrate was changed to 279 mm, the length of the part coated with the adhesive was changed to 235 mm and further the die of the crosshead was changed to a die of 14.0 mm in inner diameter. Then, this was heated in the same way as Example 1, and thereafter end portions of the elastic layer were so cut and removed that the elastic layer was 235 mm in length in the axial direction of the electrically conducting substrate. Finally, the surface of the elastic layer was sanded with a rotary grinding wheel. Thus, an electrically conducting elastic roller was obtained which was 12.0 mm in diameter at the middle portion Further, a surface layer was formed on the peripheral surface of this electrically conducting elastic roller in the same way as Example 1 to obtain an electrically conducting roller. Evaluation was made in the same way as Example 1 except that the following image evaluation was made in place of the image evaluation described previously. The results of evaluation are shown in Table 11.

The electrically conducting roller obtained in Example 38 was evaluated with use of a color laser beam printer (trade name: COLOR LASERJET CP2025dn; manufactured by Japan Hewlett-Packard Company) and a conversion cartridge of a process cartridge for this color laser beam printer. The process cartridge was one in which its developing blade was changed for a blade of 100 μm and made of stainless steel SUS304 and, as a toner, a magenta toner carried in the process cartridge was used as it was.

Next, the process cartridge fitted with this electrically conducting roller as a developing roller was left to stand for 48 hours in a low-temperature and low-humidity environment of temperature 30° C. and humidity 80% RH, and thereafter this process cartridge was incorporated into the color laser beam printer, having been left to stand in the same environment as that for the process cartridge. In the same environment, developing blade bias was set to be a voltage lower by 300 V than developing roller bias. Images reproduced were good, and had no problem in practical use.

Example 39

An electrically conducting substrate covered on its surface with the unvulcanized rubber composition 1 was obtained in the same way as Example 1 except that, in Example 1, the whole length of the electrically conducting substrate was changed to 279 mm, the length of the part coated with the adhesive was changed to 235 mm and further the die of the crosshead was changed to a die of 16.0 mm in inner diameter. Then, this was heated in the same way as Example 1, and thereafter end portions of the elastic layer were so cut and removed that the elastic layer was 235 mm in length in the axial direction of the electrically conducting substrate. Finally, the surface of the elastic layer was sanded with a rotary grinding wheel. Thus, an electrically conducting elastic roller was obtained which was 14.0 mm in diameter at the middle portion.

Further, a surface layer was formed on the peripheral surface of this electrically conducting elastic roller in the same way as Example 1 to obtain an electrically conducting roller. Evaluation was made in the same way as Example 1 except that the following image evaluation was made in place of the image evaluation described previously. The results of evaluation are shown in Table 11.

The electrically conducting roller obtained in Example 39 was incorporated into an electrophotographic laser beam printer (trade name: HP COLOR LASERJET ENTERPRISE CP4525dn; manufactured by Hewlett-Packard Company) as a primary transfer roller, where images were reproduced.

Stated specifically, using this process cartridge, a running test was conducted in an environment of temperature 23° C. and humidity 50% RH. The running test was a test in which an intermittent image forming operation such that, after images were reproduced on 2 sheets, the rotation of a photosensitive drum was completely stopped for about 3 seconds and then the images were again started to be reproduced was repeated to reproduce electrophotographic images on 40,000 sheets. The images reproduced on that occasion were such images that alphabet letters "E" of 4-point in size were so printed as to be 1% in coverage with respect to the area of an A4 size sheet.

Next, the electrically conducting roller was again incorporated as the primary transfer roller into this process cartridge, and images were reproduced to make evaluation. The images were all evaluated in an environment of temperature 15° C. and humidity 10% RH, and by reproducing halftone (an image in which horizontal lines were each drawn in a width of 1 dot and at intervals of 2 dots in the direction perpendicular to the rotational direction of the photosensitive member) images. As the result, good images were obtained.

Each composition of the epichlorohydrin rubbers used in Examples 1 to 39 is shown in Tables 10-1 and 10-2.

TABLE 10-1

| | AO unit | | ECH unit | Sulfo unit | | Allylglycidyl ether unit | Other unit | |
|---|---|---|---|---|---|---|---|---|
| Example: | Structure (*) | Content in epichlorohydrin rubber (% by mass) | Content in epichlorohydrin rubber (% by mass) | Structural formula No. | Content in epichlorohydrin rubber (% by mass) | Content in epichlorohydrin rubber (% by mass) | Structural formula No. | Content in epichlorohydrin rubber (% by mass) |
| 1 | EO | 55.3 | 36.3 | 5 | 0.6 | 7.8 | — | — |
| 2 | EO | 55.4 | 36.6 | 5 | 0.1 | 7.9 | — | — |
| 3 | EO | 37.1 | 55.4 | 5 | 0.6 | 6.9 | — | — |
| 4 | EO | 36.7 | 53.6 | 5 | 2.9 | 6.8 | — | — |
| 5 | EO | 37.1 | 55.4 | 6 | 0.6 | 6.9 | — | — |
| 6 | EO | 37.1 | 55.3 | 7 | 0.7 | 6.9 | — | — |
| 7 | EO | 37.1 | 55.3 | 8 | 0.7 | 6.9 | — | — |
| 8 | EO | 19.9 | 75.8 | 6 | 0.6 | 3.7 | — | — |
| 9 | EO | 13.4 | 74.9 | 5 | 0.6 | 11.1 | — | — |
| 10 | EO | 13.3 | 74.8 | 7 | 0.8 | 11.1 | — | — |
| 11 | EO | 13.4 | 74.8 | 8 | 0.7 | 11.1 | — | — |
| 12 | EO | 30.1 | 62.8 | 5 | 0.6 | 6.5 | — | — |
| 13 | EO | 30.1 | 62.8 | 6 | 0.6 | 6.5 | — | — |
| 14 | EO | 30 | 62.7 | 7 | 0.8 | 6.5 | — | — |
| 15 | EO | 24.5 | 70.1 | 7 | 0.8 | 4.6 | — | — |
| 16 | EO | 33 | 66.3 | 8 | 0.7 | 0 | — | — |
| 17 | EO | 42.5 | 56.8 | 6 | 0.7 | 0 | — | — |
| 18 | EO | 24.3 | 64.4 | 5 | 0.6 | 10.7 | — | — |
| 19 | EO | 42 | 50.3 | 5 | 0.6 | 7.1 | — | — |
| 20 | EO | 42.1 | 50.6 | 5 | 0.2 | 7.1 | — | — |

TABLE 10-2

| | AO unit | | ECH unit | Sulfo unit | | Allylglycidyl ether unit | Other unit | |
| --- | --- | --- | --- | --- | --- | --- | --- | --- |
| | Structure (*) | Content in epichlorohydrin rubber (% by mass) | Content in epichlorohydrin rubber (% by mass) | Structural formula No. | Content in epichlorohydrin rubber (% by mass) | Content in epichlorohydrin rubber (% by mass) | Structural formula No. | Content in epichlorohydrin rubber (% by mass) |
| Example: | | | | | | | | |
| 21 | EO | 41.5 | 48.5 | 5 | 2.9 | 7.1 | — | — |
| 22 | EO | 42.0 | 50.3 | 6 | 0.6 | 7.1 | — | — |
| 23 | EO | 41.9 | 50.2 | 7 | 0.8 | 7.1 | — | — |
| 24 | EO | 41.9 | 50.2 | 8 | 0.8 | 7.1 | — | — |
| 25 | EO | 6.0 | 89.5 | 5 | 0.6 | 3.9 | — | — |
| 26 | EO | 6.0 | 87.2 | 5 | 2.9 | 3.9 | — | — |
| 27 | EO | 38.1 | 32.5 | 5 | 0.5 | 6.5 | 9 | 22.4 |
| 28 | EO | 5.3 | 59.5 | 5 | 0.5 | 3.4 | 9 | 31.3 |
| 29 | EO | 10.8 | 33.4 | 5 | 0.5 | 9 | 9 | 46.3 |
| 30 | PO | 59.6 | 33.2 | 5 | 0.6 | 6.6 | — | — |
| 31 | BO | 54.2 | 39.6 | 5 | 0.6 | 5.6 | — | — |
| 32 | PO | 43.8 | 49.5 | 5 | 0.6 | 6.1 | — | — |
| 33 | BO | 34.8 | 60.6 | 5 | 0.6 | 4 | — | — |
| 34 | PO | 7.8 | 87.8 | 5 | 0.6 | 3.8 | — | — |
| 35 | BO | 52.1 | 32.6 | 5 | 0.6 | 5.4 | 9 | 9.3 |
| 36 | PO | 13.8 | 32.2 | 5 | 0.5 | 8.7 | 9 | 44.8 |
| 37 | EP | 37.1 | 55.4 | 5 | 0.6 | 6.9 | — | — |
| 38 | EO | 55.3 | 36.3 | 5 | 0.6 | 7.8 | — | — |
| 39 | EO | 42.0 | 50.3 | 5 | 0.6 | 7.1 | — | — |
| Comparative Example: | | | | | | | | |
| 1 | EO | 55.4 | 36.7 | — | — | 7.9 | — | — |

(*) EO: Ethylene oxide unit; PO: Propylene oxide unit; BO: Butylene oxide unit

Structures 6 to 9 (corresponding to the structural formulas 6 to 9) of the sulfo unit and other unit entered in Tables 10-1 and 10-2 each are shown below.

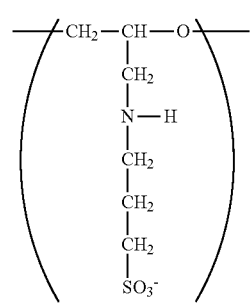

Structural formula 6

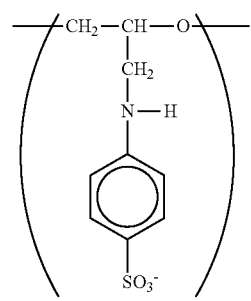

Structural formula 7

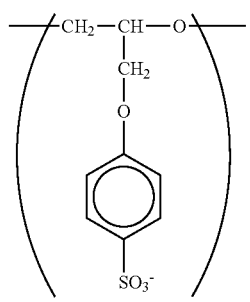

Structural formula 8

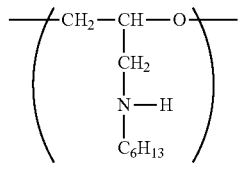

Structural formula 9

TABLE 11

| | Initial current value (μA) | N/N Current value after appln. (μA) | Current value change rate | L/L Current value (μA) | H/H Current value (μA) | Environmental dependence (H/H)/(L/L) | Image evaluation rank | Bleeding rank |
|---|---|---|---|---|---|---|---|---|
| Example: | | | | | | | | |
| 1 | 1,998 | 1,296 | 35% | 950 | 4,194 | 4.41 | A | A |
| 2 | 1,247 | 811 | 35% | 594 | 2,617 | 4.41 | A | A |
| 3 | 1,233 | 799 | 35% | 587 | 2,219.4 | 3.78 | A | A |
| 4 | 2,466 | 1,601 | 35% | 1,173 | 4,438 | 3.78 | A | A |
| 5 | 1,240 | 803 | 35% | 589 | 2,231 | 3.79 | A | A |
| 6 | 1,231 | 796 | 35% | 585 | 2,214 | 3.78 | A | A |
| 7 | 1,225 | 795 | 35% | 584 | 2,204 | 3.77 | A | A |
| 8 | 730 | 473 | 35% | 349 | 1,312 | 3.76 | B | A |
| 9 | 652 | 421 | 35% | 311 | 1,172 | 3.77 | B | A |
| 10 | 638 | 415 | 35% | 304 | 1,147 | 3.77 | B | A |
| 11 | 628 | 409 | 35% | 300 | 1,129 | 3.76 | B | A |
| 12 | 815 | 530 | 35% | 389 | 1,465 | 3.77 | B | A |
| 13 | 820 | 532 | 35% | 391 | 1,475 | 3.77 | B | A |
| 14 | 835 | 543 | 35% | 396 | 1,501 | 3.79 | B | A |
| 15 | 760 | 496 | 35% | 359 | 1,365 | 3.80 | B | A |
| 16 | 951 | 619 | 35% | 453 | 1,709 | 3.77 | B | A |
| 17 | 1,227 | 780 | 36% | 585 | 2,574 | 4.40 | A | A |
| 18 | 780 | 509 | 35% | 371 | 1,399 | 3.77 | B | A |
| 19 | 1,125 | 732 | 35% | 535 | 2,364 | 4.42 | A | A |
| 20 | 573 | 373 | 35% | 276 | 1,205 | 4.37 | B | A |
| 21 | 2,300 | 1,496 | 35% | 1,098 | 4,835 | 4.40 | A | A |
| 22 | 1,170 | 763 | 35% | 558 | 2,451 | 4.39 | A | A |
| 23 | 1,142 | 745 | 35% | 546 | 2,399 | 4.39 | A | A |
| 24 | 1,163 | 752 | 35% | 553 | 2,443 | 4.42 | A | A |
| 25 | 560 | 365 | 35% | 268 | 1,175 | 4.38 | B | A |
| 26 | 1,080 | 703 | 35% | 514 | 2,270 | 4.42 | A | A |
| 27 | 1,073 | 698 | 35% | 511 | 2,256 | 4.41 | A | A |
| 28 | 486 | 316 | 35% | 232 | 1,019 | 4.39 | C | A |
| 29 | 523 | 341 | 35% | 249 | 941 | 3.78 | C | A |
| 30 | 731 | 476 | 35% | 430 | 1,239 | 2.88 | C | A |
| 31 | 648 | 420 | 35% | 379 | 1,099 | 2.90 | C | A |
| 32 | 530 | 345 | 35% | 309 | 899 | 2.91 | C | A |
| 33 | 462 | 301 | 35% | 272 | 786 | 2.89 | C | A |
| 34 | 375 | 244 | 35% | 222 | 639 | 2.88 | C | A |
| 35 | 712 | 465 | 35% | 420 | 1,211 | 2.88 | C | A |
| 36 | 432 | 279 | 35% | 256 | 736 | 2.88 | C | A |
| 37 | 1,000 | 901 | 10% | 289 | 4,989 | 17.26 | A | B |
| 38 | 2,150 | 1,400 | 35% | 1,025 | 4,512 | 4.40 | — | A |
| 39 | 1,172 | 762 | 35% | 559 | 2,463 | 4.41 | — | A |
| Comparative Example: | | | | | | | | |
| 1 | 2,100 | 780 | 63% | 998 | 4,409 | 4.42 | D | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-282226, filed Dec. 22, 2011, which is herein incorporated by reference herein in its entirety.

What is claimed is:

1. An electrically conducting member for electrophotography comprising: an electrically conducting substrate and an electrically conducting layer provided thereon, wherein;
the electrically conducting layer comprises an epichlorohydrin rubber having in the molecular structure at least an alkylene oxide unit, an epichlorohydrin unit and a unit having a sulfonate ion;
the alkylene oxide unit being at least one unit selected from the group consisting of an ethylene oxide unit, a propylene oxide unit and a butylene oxide unit; and wherein;
the total content of the alkylene oxide unit(s) in the epichlorohydrin rubber is from 5% by mass or more to 60% by mass or less, and
the content of the epichlorohydrin unit in the epichlorohydrin rubber is 30% by mass or more.

2. The electrically conducting member according to claim 1, wherein the alkylene oxide unit is at least one unit of the propylene oxide unit and the butylene oxide unit.

3. The electrically conducting member according to claim 1, wherein the unit having a sulfonate ion has a structure in which chlorine atom in the epichlorohydrin unit is substituted with a group having a sulfonate ion.

4. The electrically conducting member according to claim 1, wherein the unit having a sulfonate ion is a unit represented by the following structural formula 1:

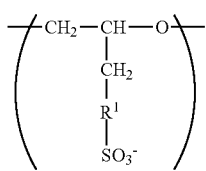

Structural formula 1 where, in the structural formula 1, $R^1$ represents a unit selected from the group consisting of units represented respectively by the following structural formulas 2 to 4:

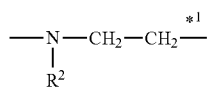

Structural formula 2

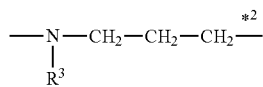

Structural formula 3

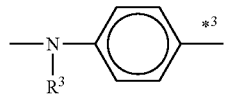

Structural formula 4 where, in the structural formulae 2 to 4, $R^2$, $R^3$ and $R^4$ each independently represent a hydrogen atom or an methyl group, and asterisks *1 to *3 each represent the position of bonding with the $SO_3^-$ in the structural formula 1.

5. The electrically conducting member according to claim 1, wherein the epichlorohydrin rubber contains an allyl glycidyl ether unit.

6. The electrically conducting member according to claim 1, wherein the epichlorohydrin rubber is a rubber produced by beforehand copolymerizing at least i) at least one alkylene oxide of ethylene oxide, propylene oxide and butylene oxide and ii) epichlorohydrin to obtain a copolymer and thereafter introducing the sulfonate ion into the ECH unit in the copolymer.

7. A process cartridge which is so constituted as to be detachably mountable to the main body of an electrophotographic apparatus, and comprises the electrically conducting member according to claim 1.

8. An electrophotographic apparatus which comprises the electrically conducting member according to claim 1.

* * * * *